United States Patent
Bendel et al.

(10) Patent No.: US 12,187,219 B2
(45) Date of Patent: Jan. 7, 2025

(54) PYROTECHNIC GAS GENERATOR

(71) Applicant: ZF Airbag Germany GmbH, Aschau a. Inn (DE)

(72) Inventors: Elmar Bendel, Traunstein (DE); Detlef Last, Mühldorf am Inn (DE)

(73) Assignee: ZF AIRBAG GERMANY GMBH, Aschau a. Inn (DE)

( * ) Notice: Subject to any disclaimer, the term of this patent is extended or adjusted under 35 U.S.C. 154(b) by 57 days.

(21) Appl. No.: 16/769,238

(22) PCT Filed: Nov. 21, 2018

(86) PCT No.: PCT/EP2018/082006
§ 371 (c)(1),
(2) Date: Jun. 2, 2020

(87) PCT Pub. No.: WO2019/110298
PCT Pub. Date: Jun. 13, 2019

(65) Prior Publication Data
US 2021/0179011 A1 Jun. 17, 2021

(30) Foreign Application Priority Data
Dec. 5, 2017 (DE) .......................... 102017128886.4

(51) Int. Cl.
*B60R 21/264* (2006.01)
*B60R 21/26* (2011.01)

(52) U.S. Cl.
CPC *B60R 21/2644* (2013.01); *B60R 2021/26041* (2013.01); *B60R 2021/2648* (2013.01)

(58) Field of Classification Search
CPC ...... B60R 21/2644; B60R 2021/26041; B60R 2021/2648; B60R 2021/26029
See application file for complete search history.

(56) References Cited

U.S. PATENT DOCUMENTS 5,419,578 A 5/1995 Storey et al.
6,237,498 B1 * 5/2001 Winterhalder ...... B60R 21/2644
102/530
(Continued)

FOREIGN PATENT DOCUMENTS

DE 4324554 A1 1/1995
DE 19918401 A1 1/2000
(Continued)

OTHER PUBLICATIONS

DE-10333173-A1 from above (machine translation) (Year: 2005).*
(Continued)

*Primary Examiner* — Jason D Shanske
*Assistant Examiner* — Joselynn Y Sliteris
(74) *Attorney, Agent, or Firm* — Tarolli, Sundheim, Covell & Tummino LLP (57) ABSTRACT

The present disclosure relates to a gas generator comprising a housing, an igniter and a pyrotechnic charge via which gas for filling a gasbag can be provided, wherein the gas generator is free from stored pressurized gas in the idle state, characterized in that each possible diffusion path out of the internal chamber of the housing is sealed relative to the environment of the gas generator by means of a weld seam. The present disclosure also relates to a method for leak testing a pyrotechnic gas generator of this type, wherein, before the gas generator is welded against diffusion, a test amount of helium is introduced into the housing and, in a subsequent leak testing step, a measurement is carried out to determine whether helium is passing out of the housing.

18 Claims, 5 Drawing Sheets

(56) References Cited

U.S. PATENT DOCUMENTS

| | | | |
|---|---|---|---|
| 6,276,717 B1* | 8/2001 | Katsuda | B60R 21/2644 |
| | | | 280/736 |
| 6,634,299 B2* | 10/2003 | Vetter | F42B 3/26 |
| | | | 280/743.1 |
| 6,709,011 B2* | 3/2004 | Neunzert | B60R 21/2644 |
| | | | 280/736 |
| 6,779,812 B2* | 8/2004 | Ishida | B60R 21/2644 |
| | | | 280/728.1 |
| 7,686,330 B2* | 3/2010 | Meixner | B60R 21/261 |
| | | | 280/741 |
| 8,556,294 B1* | 10/2013 | Norman, III | B60R 21/264 |
| | | | 280/736 |
| 8,820,783 B1 | 9/2014 | Thompson et al. | |
| 8,960,718 B2* | 2/2015 | Patton | B60R 21/2644 |
| | | | 280/737 |
| 11,247,634 B2* | 2/2022 | Bierwirth | B60R 21/272 |
| 2002/0113420 A1 | 8/2002 | Neunzert et al. | |
| 2005/0046161 A1 | 3/2005 | Canterberry et al. | |
| 2009/0283006 A1 | 11/2009 | Abaziou | |
| 2010/0176580 A1 | 7/2010 | Tauchen | |
| 2017/0259775 A1* | 9/2017 | Bierwirth | B60R 21/274 |
| 2018/0304818 A1 | 10/2018 | Flaherty | |
| 2020/0139926 A1* | 5/2020 | Bendel | B60R 21/2644 |

FOREIGN PATENT DOCUMENTS

| | | | | |
|---|---|---|---|---|
| DE | 69707095 T2 | | 3/2002 | |
| DE | 20219898 U1 | | 6/2003 | |
| DE | 102004027153 A1 | | 12/2004 | |
| DE | 10333173 A1 | * | 2/2005 | B60R 21/2644 |
| DE | 102013211218 A1 | * | 12/2014 | B60R 21/26 |
| EP | 0841225 A1 | | 5/1998 | |
| EP | 1209045 A1 | * | 5/2002 | B60R 21/26 |

OTHER PUBLICATIONS

EP-1209045-A1 from above (machine translation) (Year: 2002).*
DE-102013211218-A1 (machine translation) (Year: 2014).*
DE-10333173-A1 (Year: 2005).*

* cited by examiner

PYROTECHNIC GAS GENERATOR

CROSS-REFERENCE TO RELATED APPLICATION

This application is a national stage of International Application No. PCT/EP2018/082006 filed Nov. 21, 2018, the disclosure of which is incorporated herein by reference in its entirety, and which claimed priority to German Patent Application No. 102017128886.4, filed Dec. 5, 2017, the disclosure of which is incorporated herein by reference in its entirety.

TECHNICAL FIELD

The present disclosure relates to a gas generator comprising a housing, an igniter and a pyrotechnic charge via which gas for filling an airbag can be provided, wherein the gas generator is free from stored pressurized gas in its idle state. Further, the present disclosure relates to a method for leak testing a pyrotechnic gas generator and to a method for producing a housing assembly of such pyrotechnic gas generator.

BACKGROUND

The gas generator serves for filling an airbag with a gas or, resp., a filling gas in the case of need, i.e. upon activation of the gas generator. The substantial characteristic of such gas generator is a pyrotechnic charge in the form of a solid propellant which is ignited by an igniter, wherein by its burn-off the pyrotechnic charge then provides and, resp., generates a specific amount of gas which is introduced into the airbag to deploy and, resp., fill the latter.

A different design of a gas generator (which is not relevant here) relates to gas generators having a pressure reservoir in which an amount of highly pressurized gas is enclosed in the idle state already, i.e. prior to activation, of said gas generator. Upon activation of the gas generator, said pressurized gas can be released and introduced into an airbag. Said gas generators are referred to as cold gas or hybrid gas generators depending on the concrete embodiment.

In the present gas generator of the present disclosure, in the idle state thereof no highly pressurized gas is provided, however, so that the present gas generator is a purely pyrotechnic gas generator. It is important for pyrotechnic gas generators of this type that the pyrotechnic charge is accommodated while being reliably sealed against the environment of the gas generator.

It is known from prior art that discharge openings in the housing of a gas generator through which the filling gas generated when the pyrotechnic charge is burnt off is passed out of the gas generator are closed by a so-called tamping, e.g. a metal foil having an additional adhesive layer, in that the tamping is appropriately glued onto the housing. In addition, thus also discharge openings of an ignition chamber, for example, can be sealed relative to a combustion chamber in which the pyrotechnic charge is accommodated, or discharge openings out of the combustion chamber can be sealed such that the pyrotechnic charge is sealed relative to the environment of the gas generator (cf. for example DE 10 2004 027 153 A1).

Another example is illustrated in DE 202 19 898 U1 in which a tamping foil is glued onto the inner face of a combustion chamber wall so that all discharge openings in the combustion chamber are closed.

In addition to such glued-on tampings, it is known that the spaces in which a pyrotechnic charge or pyrotechnic propellant is disposed are sealed relative to the environment by means of inserted gasket rings, e.g. O-rings made from plastic, or by injected plastic material or in any similar manner.

When purely pyrotechnic gas generators are manufactured with such glued-on tampings, there are the drawbacks, however, that handling and, resp., frame conditions for gluing on a tamping mean a certain increased expenditure of time and cost, as in this case specific pressing devices and pressing procedures are required for a gluing operation of such tamping. In addition, a sufficiently large adhesive surface for the tamping must be provided to ensure appropriate adhesion of the tamping to the counter-piece onto which the tamping has to be glued. Then the tamping itself has to be designed to be appropriately large as compared to an opening which such tamping is intended to close. Finally, concerning a known glued-on tamping there is the further drawback that a sufficiently large distance has to be observed from a welding or a weld seam provided after gluing on the tamping in the environment of said tamping to prevent a respectively forming heat impact zone from negatively affecting the gluing and, resp., an adhesive layer on the tamping.

SUMMARY

Consequently, it is the object of the present disclosure to eliminate and, resp., alleviate at least one of the aforementioned drawbacks.

For achieving this object, according to the present disclosure it is provided, with respect to the gas generator, for a gas generator of the type mentioned in the beginning that each possible diffusion path out of the interior of the housing to the environment of the gas generator is sealed by means of a weld seam. In addition, this object is also achieved by providing, according to the present disclosure, in a gas generator of the type mentioned in the beginning the housing of the gas generator to be hermetically sealed by being formed exclusively from components made from metal being welded to one another.

It has been known so far to carry out welding of appropriately stable and massive component parts for sealing pressurized gas tanks in cold gas or hybrid gas generators which, in contrast to the gas generator of the present disclosure, include stored pressurized gas which is under a pressure of several hundred bars. Accordingly, for example a pressurized gas tank and a welded-on burst membrane closing the latter must be designed to be adequately massive to withstand an internal excess pressure of about 600 to 800 bars. Equally, also the welding itself has to be designed to be adequately massive, i.e. having a relatively large melting zone.

A purely pyrotechnic gas generator, on the other hand, as it is present in a gas generator of the present disclosure, has in its interior merely a pressure level that is in the range of the atmospheric pressure and that is by no means comparable to an afore-mentioned internal excess pressure of about 600-800 bars of a cold gas or hybrid gas generator. Thus, also in purely pyrotechnic gas generators, the gluing-on of tampings for sealing known so far had been used.

According to the present disclosure, it is not necessary for each interior of the gas generator to be welded against diffusion. It is sufficient when each possible diffusion path is closed at least in one position by means of a weld seam. In a simple example, this condition is met when all external seams are welded and all external openings are closed by means of a welded tamping. This condition is also met when external spaces of the gas generator are not welded against the environment but inside said spaces there is no pyrotechnic charge and, instead, the space in which the pyrotechnic charge is provided is hermetically welded.

According to the present disclosure, it is therefore necessary that the housing of the gas generator is hermetically sealed by being formed exclusively from components of metal welded to one another. This means that there is so-to-speak a continuous contour of metal which constitutes the contour for the housing of the pyrotechnic gas generator in which the pyrotechnic charge is stored, wherein said contour may comprise at least subareas of various metallic components and corresponding metallic welds for connecting said metallic components. It is certainly possible in this context that further metallic and/or non-metallic parts and, resp., components of the pyrotechnic gas generator can be tightly connected and, resp., fastened to the housing, either inside or else outside the latter.

It is possible, for example, that the igniter is fastened outside the hermetically sealed housing. Here, the igniter can be accommodated and fastened as a prefabricated part in a metallic igniter carrier which constitutes a metallic component of the housing, wherein the igniter, when viewed per se, is no component of the housing of the gas generator.

Rather, the igniter may be accommodated in the igniter carrier and a metallic tamping, especially in the form of a cap, may be welded to the igniter carrier by a radially circumferential weld seam to hermetically seal the housing relative to the igniter. In this case, the metallic tamping has to be added to the housing of the gas generator, as it constitutes a component of the housing, wherein in this case the igniter does not constitute a component of the housing of the gas generator and has to be considered to be a part outside the housing of the gas generator.

Depending on the configuration of the gas generator, there are different positions at which the diffusion-tight weld seam can be provided. For example, when the housing includes a tube and the igniter is mounted on an igniter carrier, the igniter carrier can be welded to the tube, especially in a front-side opening of the tube. When the housing includes a bottom plate in addition to the tube, the bottom plate may be welded to the tube.

It is of particular importance that the housing, too, may include at least one discharge opening which is closed by a tamping and that the tamping is welded to the housing. For example, when the discharge opening is provided in a bottom plate of the housing, the tamping can be welded to the bottom plate there. When the bottom plate separates a combustion chamber of the gas generator from a filter chamber, the tamping can be welded either on the combustion chamber side, i.e. "inside", or on the filter chamber side, especially to the bottom plate. When the housing is tubular and an opening acting as a discharge opening is provided in a wall of the tubular housing, the tamping is welded to the tubular housing and closes the opening.

Preferably, the housing of the gas generator may comprise a lower shell and an upper shell which are connected to each other radially circumferentially by a weld seam, the igniter being mounted in an igniter carrier and the igniter carrier being accommodated in an opening within the lower shell and being fastened there by means of a weld seam.

According to a preferred embodiment of the present disclosure, the inner volume of the housing is provided to contain a test amount of helium. The test amount is such low volume that it is negligible as compared to the volume of pressurized gas generated when the pyrotechnic charge is burnt off. The addition of a small amount of helium to the inner volume of the gas generator enables leak testing, especially vacuum testing, to be carried out with little effort.

Consequently, in accordance with the present disclosure, a method for leak testing a pyrotechnic gas generator is provided in which, before the gas generator is welded against diffusion, a test amount of helium is introduced into the housing and in a subsequent leak testing step it is measured whether helium escapes from the housing. Helium helps to detect already minor leaks so that very reliable testing of the gas generators is possible with little effort. In particular, a volume percentage within a range from 2% to 5% of helium is understood to be a test amount or, resp., a small amount of helium, as compared to the residual volume present in the gas generator which is filled by gaseous material.

According to a preferred embodiment of the present disclosure, the housing of the gas generator may include a lower shell and an upper shell connected by a, preferably radially circumferential, weld seam, the housing having at least one discharge opening which is closed by a tamping. The tamping is welded to the housing at least in an area between the discharge opening and the weld seam. Of preference, the at least one discharge opening is arranged in the upper shell of the gas generator, especially in a peripheral sidewall thereof. There may also be arranged a plurality of discharge openings, especially radially circumferentially, in one row or in plural axially superimposed rows in the housing and may be closed by the tamping.

It is the advantage of such arrangement, irrespective of hermetically sealing the housing of the gas generator, that the gas generator can be designed to be lower with respect to its overall height and thus requires less space and, resp., shows a lower height than known constructional designs which have a tamping glued onto the discharge opening(s). As the tamping according to the present disclosure is welded to the housing of the gas generator at least in an area between the discharge opening and the weld seam by which the lower shell and the upper shell are interconnected, a minimum or relatively small distance between the weld seam and the discharge opening is sufficient already to connect the tamping tightly, viz. by means of welding, to the housing of the gas generator. Basically, such distance which merely constitutes the extension of and, resp., the space required by the welding by which the tamping is welded to the housing of the gas generator is sufficient as the distance between the discharge opening, viz. its peripheral edge defining the discharge opening and, resp., delimiting the latter against the housing material, and the weld seam that connects the lower shell to the upper shell. In other words, the weld seam connecting the lower shell to the upper shell can directly abut on the welding by which the tamping is welded to the housing of the gas generator, thus allowing the gas generator to be manufactured with a lower total height. In a known constructional design having a tamping glued onto the discharge opening, a certain safety distance, for example of several millimeters, from an edge of the tamping to a closest weld seam, for example a weld seam which connects the lower shell to the upper shell of a housing of the gas generator, must be observed so that the gluing and, resp., the adhesion of the known glued-on tamping is not adversely affected by the thermal impact of a subsequent welding during manufacture of the gas generator. Such safety distance can be renounced in the afore-described design according to the present disclosure, thus allowing the gas generator according to the present disclosure to be manufactured to be shorter or, resp., lower by several millimeters, e.g. 3.7 mm.

In such gas generator according to the present disclosure, of preference the tamping can also be fastened radially circumferentially on the housing, preferably on the upper shell of the housing, especially substantially in parallel to the weld seam. This means that the tamping can be fastened to the housing of the gas generator by one or else by several, preferably by two, axially spaced and radially circumferential welds or weld seams. Advantageously, said welds or weld seams are geometrically oriented such that a weld seam attached subsequently with respect to the manufacture of the gas generator, e.g. the weld seam which connects the lower shell to the upper shell, is oriented substantially in parallel to said welds or weld seams by which the tamping is fastened to the housing. This fact brings about an efficient and space-saving design of the machines, especially welding devices, for manufacturing the gas generator.

As an alternative, the tamping may also be welded to the housing annularly around the at least one discharge opening. This means that a weld seam for fastening the tamping and thus for covering the discharge opening in the housing can be placed in an extremely space-saving and material-saving manner around the discharge opening by radially circumferentially fastening the tamping to the direct edge zone of the housing material which defines and, resp., surrounds the discharge opening.

Equally advantageously, also a gas generator and, resp., a housing assembly for a gas generator having a reduced overall height can be manufactured according to the following inventive method by the following steps in the order as stated in the following.

Providing a lower shell and an upper shell having at least one discharge opening for a housing, especially outer housing, of the gas generator, and providing a tamping.

Subsequently welding the tamping to the upper shell, especially with the inner face thereof, such that the tamping closes the at least one discharge opening.

Subsequently welding the upper shell to the lower shell, especially by a radially circumferential weld seam.

Herefrom are resulting advantages as they have been described already before concerning a gas generator according to the present disclosure. In particular, an extremely low housing assembly can be manufactured for a pyrotechnical gas generator by space-saving close abutment of the welding of the tamping to the upper shell on the radially circumferential weld seam of the welding of the upper shell to the lower shell.

BRIEF DESCRIPTION OF THE DRAWINGS

Hereinafter the present disclosure shall be described by way of different embodiments illustrated in the attached drawings, wherein.

DETAILED DESCRIPTION

Figure 1:
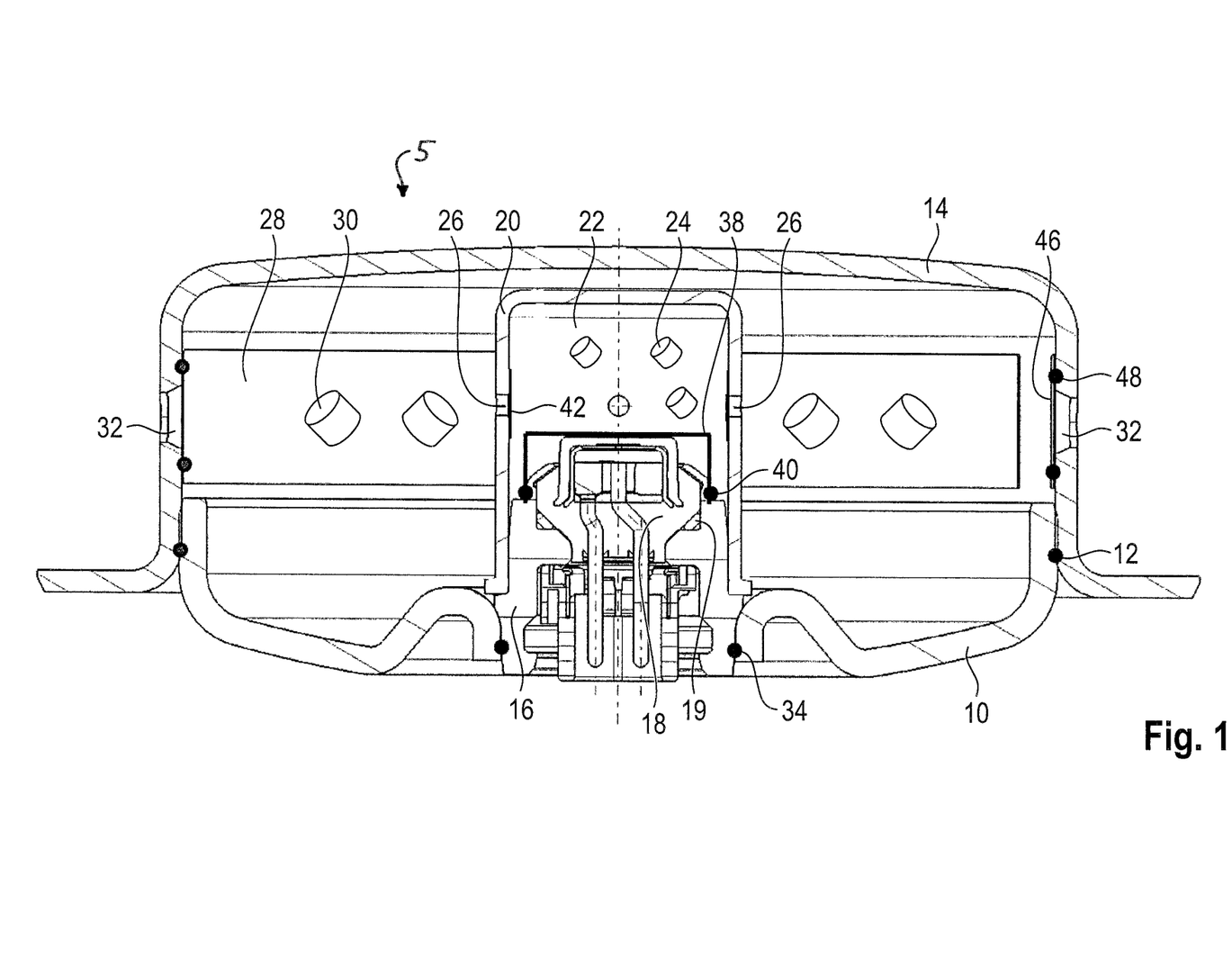
FIG. 1 shows a schematic section of a gas generator according to a first embodiment of the present disclosure.

FIG. 1 illustrates a pyrotechnic gas generator according to a first embodiment of the present disclosure which in this case has a toroidal structure. It includes a lower shell 10 which is connected in a diffusion-tight manner to an upper shell 14 by means of a circumferential weld seam 12, the lower shell 10 and the upper shell 14 forming at least a subarea of a housing (10, 14), especially an outer housing, of the gas generator. The weld seam 12 has been used per se already in the gas generators known from prior art, because it is required with respect to a sufficiently robust connection between the lower shell 10 and the upper shell 14.

In the lower shell 10 an igniter carrier 16 in which an igniter 18 is accommodated as a prefabricated part is inserted. An O-ring 19 is disposed between the igniter carrier 16 and the igniter 18.

An ignition sleeve 20 is attached to, especially slipped or pressed onto, the igniter carrier 16, the ignition sleeve surrounding a booster compartment 22 in which a pyrotechnic ignition mixture 24 (booster propellant) is accommodated.

The ignition sleeve 20 is provided with plural overflow outlets 26 through which a burn-off gas forming upon activation of the gas generator by igniting or by burning off the ignition mixture 24 in the booster compartment 22 can flow into a combustion chamber 28 of the gas generator in which a pyrotechnic charge 30 is accommodated.

The combustion chamber 28 in turn includes plural discharge openings 32 which in this case are provided in the outer wall of the upper shell 14. Through said discharge openings a burn-off gas forming upon burning off the pyrotechnic charge 30 flows out of the combustion chamber 28. The pyrotechnic charge 30 is a pyrotechnic propellant that may consist of a filling of individual propellant bodies, such as e.g. compressed propellant pellets or extruded bodies, but may also be in the form of a monolithic molded body or in the form of stringed disks or rings.

The entire gas generator is free from pre-stored pressurized gas in its idle state, viz. prior to activation. The interior of the gas generator merely has a pressure level that is prevailing in the form of an ambient pressure during manufacture of the gas generator. Consequently, the gas generator of the present disclosure is a purely pyrotechnic gas generator rather than a known hybrid gas generator which already in the idle state comprises pre-stored pressurized gas, usually at a pressure of several hundred bars.

In order to reliably seal both the ignition mixture 24 and the pyrotechnic charge 30 relative to the environment of the gas generator, several diffusion-tight weld seams are provided.

First of all, the igniter carrier 16 which is at least partly made from metal is welded to the lower shell 10 via a circumferential weld seam 34.

The interface between the igniter carrier 16 and the igniter 18 is sealed against the booster compartment 22 by means of a metallic tamping 38 which is hermetically connected to the igniter carrier 16 via a circumferential weld seam 40. The tamping 38 is in the form of a cap and thus has a closed cap bottom which merges directly into a radially circumferential cap sidewall ending with a cap opening opposed to the cap bottom. When mounting the gas generator 5, at first the O-ring 19 is inserted into the igniter carrier 16, then the igniter 18 is pressed onto the O-ring 19 and is retained in the same by means of a beaded extension of the igniter carrier 16. From FIG. 1 already said mounted state is evident with the beaded extension of the igniter carrier 16 which is pressed and, resp., beaded onto a trapezoidal area of the igniter 18. The cap-shaped tamping 38 is attached, after afore-described assembly, with its cap opening above or onto the pre-assembled igniter 18 in such way that the cap opening contacts the periphery of the igniter carrier 16 and can be connected there to the igniter carrier 16 by means of the circumferential weld seam 40. The cap bottom of the tamping 38 may contact, as illustrated in FIG. 1, the igniter 18, especially the front-side cap end thereof, or else may be at a certain distance therefrom. What is crucial is the fact that, in the afore-described connection of the tamping 38 to the igniter carrier 16 in accordance with the present disclosure, said two parts, i.e. the igniter carrier 16 and the tamping 38, are understood to be parts of the housing of the gas generator. Thus, the tamping 38 constitutes, as a component of the housing of the gas generator according to the present disclosure, also a hermetic seal and a delimitation of the gas generator from the environment thereof. As is evident from FIG. 1, the igniter 18 is thus positioned and, resp., fastened outside the housing of the gas generator.

Each of the overflow outlets 26 in the ignition sleeve 20 is closed by means of a tamping 42, e.g. a metal foil, which is glued radially circumferentially onto the inner sidewall of the ignition sleeve 20.

Finally, each of the discharge openings 32 is closed by means of a tamping 46 that is hermetically connected to the housing of the gas generator, concretely speaking here the upper shell 14, via a circumferential weld seam 48.

Each of the tampings 38, 46 is a metal foil, especially made from aluminum, copper or steel, which has a sufficient wall thickness, especially in a respective welding zone, to allow welding to the underlying carrier. The tamping 38 may also be in the form of an inherently stable metal cap.

Figure 2:
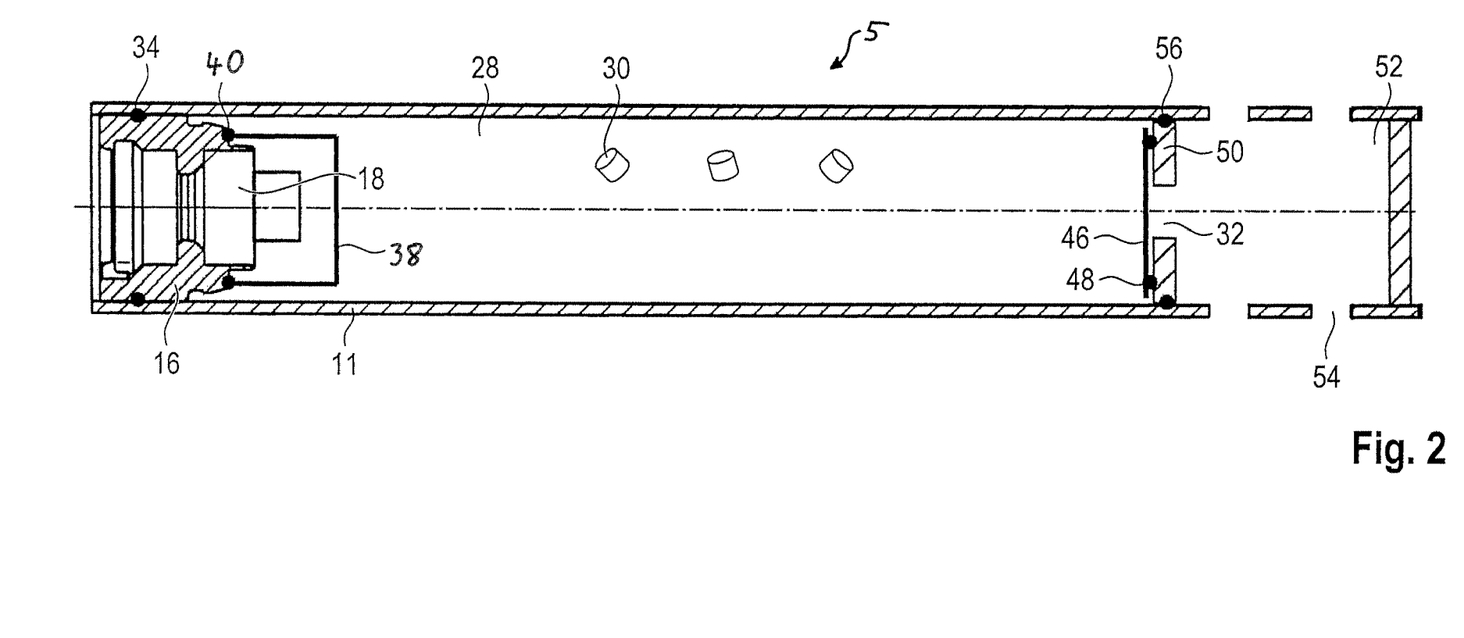
FIG. 2 shows a schematic section of a gas generator according to a second embodiment of the present disclosure.

FIG. 2 illustrates a second embodiment of a gas generator according to the present disclosure. For the component parts known from the first embodiment the same reference numerals are used and insofar the foregoing explanations are referred to.

The most essential difference between the first embodiment and the second embodiment consists in the fact that the gas generator of the second embodiment is a tubular gas generator. Accordingly, the housing 11 of the gas generator, especially a subarea of the outer housing of the gas generator, is a tube.

In the second embodiment, too, the igniter carrier 16 is inserted in the housing 11, especially in a front-side opening of the tubular housing 11, and is welded against diffusion via a circumferential weld seam 34.

Also, the tamping 38 is welded against diffusion to the igniter carrier 16 via a circumferential weld seam 40. In this case, the tamping 38 is equally in the form of an inherently stable cap, wherein, in contrast to FIG. 1, the cap bottom of the tamping 38 exhibits a clear distance from the front-side cap end of the igniter 18. Above the tamping 38 and partly surrounding the latter, an ignition sleeve (not shown) may further be positioned, similarly to FIG. 1, wherein, analogously to FIG. 1, a booster compartment 22 filled with a pyrotechnic ignition mixture (booster propellant) may form in a space between such ignition sleeve and the tamping 38. Such booster compartment comprising booster propellant is not mandatory, however, as the igniter 18, as shown in FIG. 2, can open (break or locally destroy) the tamping 38 after being activated to directly ignite the pyrotechnic charge 30.

In contrast to the first embodiment, in the second embodiment the discharge opening 32 does not lead out of the housing of the gas generator directly to the environment of the gas generator but is provided in a bottom plate or a combustion chamber bottom 50 which delimits the combustion chamber 28 comprising the pyrotechnic charge 30 toward a filter chamber 52. From the filter chamber 52 the gas or, resp., inflation gas that can be formed upon activation of the gas generator by burning off the pyrotechnic charge 30 then can flow through openings 54 into an airbag to be deployed (not shown). In the filter chamber 52 there may be located a filter (not shown), e.g. a body made from a metal reel or knitted metal fabric, which cools the gas or, resp., inflation gas and, resp., deposits slag therefrom.

The combustion chamber bottom 50 is welded against diffusion to the housing 11 by means of a circumferential weld seam 56. The tamping 46 is welded to the circumferential weld seam 48 on the combustion chamber bottom 50, namely on the inner face of the combustion chamber 28 in which the pyrotechnic charge 30 is disposed.

Figure 3:
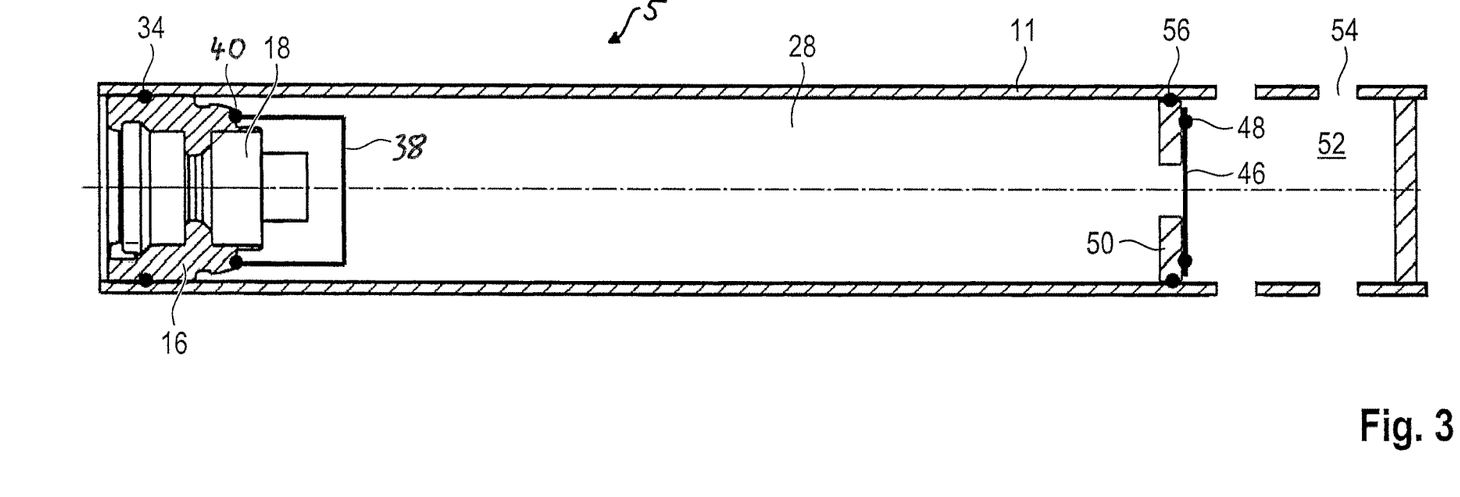
FIG. 3 shows a configuration variant of the gas generator shown in FIG. 2.

FIG. 3 illustrates a configuration variant which differs from the embodiment shown in FIG. 2 by the fact that the tamping 46 is welded to the combustion chamber bottom 50 on the outer face of the combustion chamber 28, i.e. on the side of the filter chamber 52.

Figure 4:
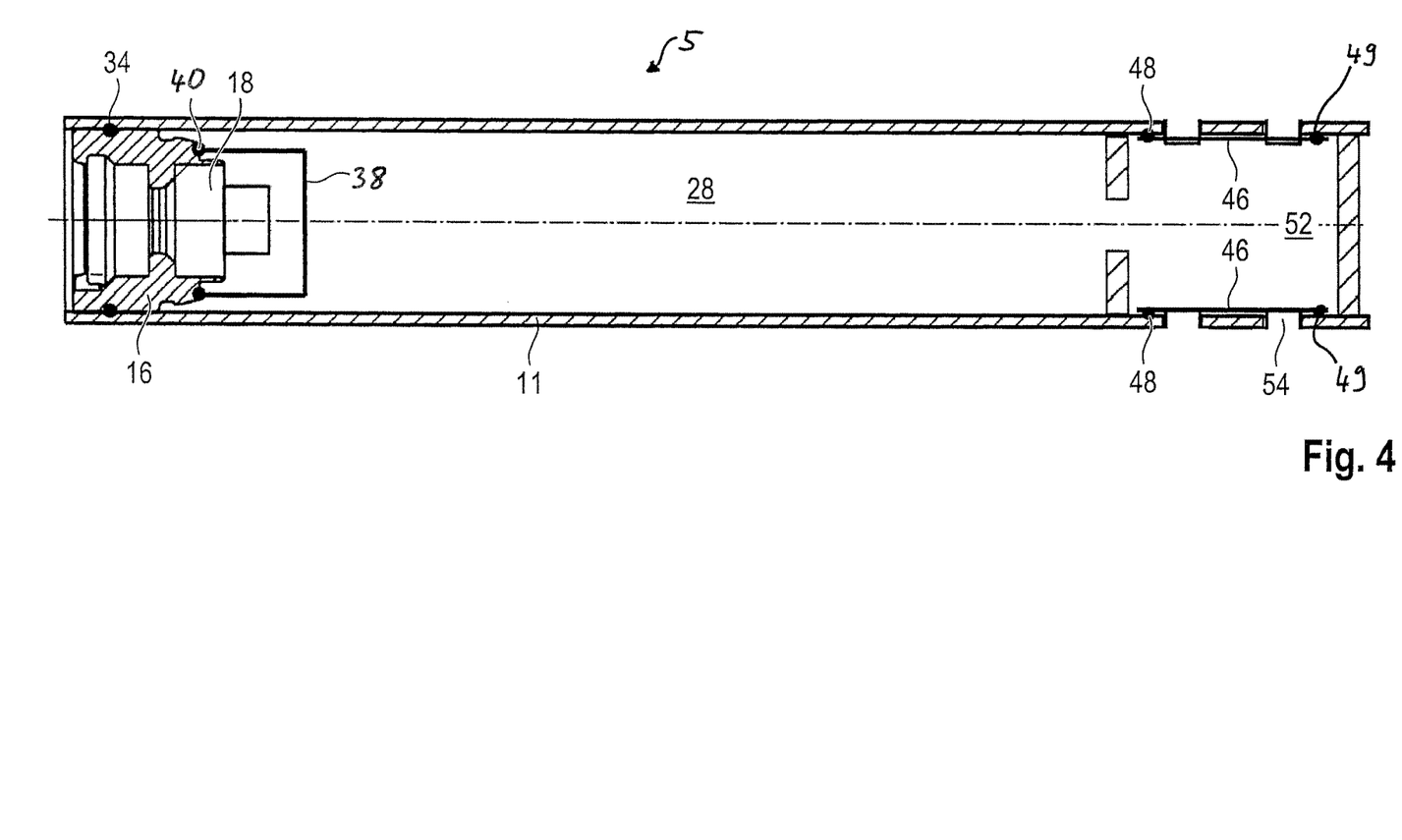
FIG. 4 shows another configuration variant of the gas generator shown in FIG. 2.

FIG. 4 illustrates another configuration variant which differs from the embodiment shown in FIG. 2 and from the configuration variant shown in FIG. 3 by the fact that the tamping 46 closes the openings 54 on the inside, i.e. on the side of the filter chamber 52, in a diffusion-tight manner. For this purpose, the tamping 46 is connected to the housing 11 by means of the circumferential welding seams 48 and 49.

By way of FIGS. 5*a*, 5*b*, and 5*c*, the method according to the present disclosure shall be described hereinafter.

Figure 5A:
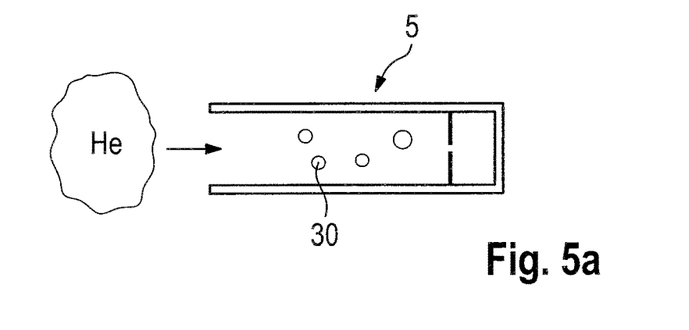
FIG. 5a illustrates the gas generator with the pyrotechnic charge.
Figure 5B:
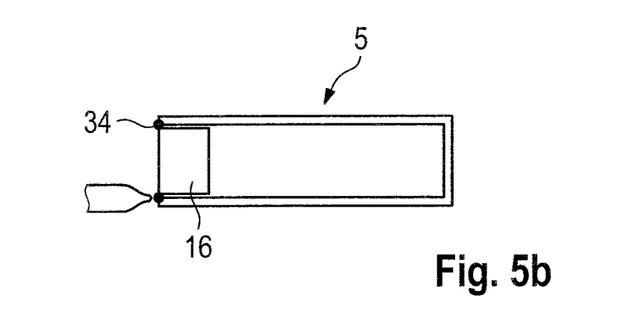
FIG. 5b illustrates the gas generator, igniter carrier, and the weld seam.
Figure 5C:
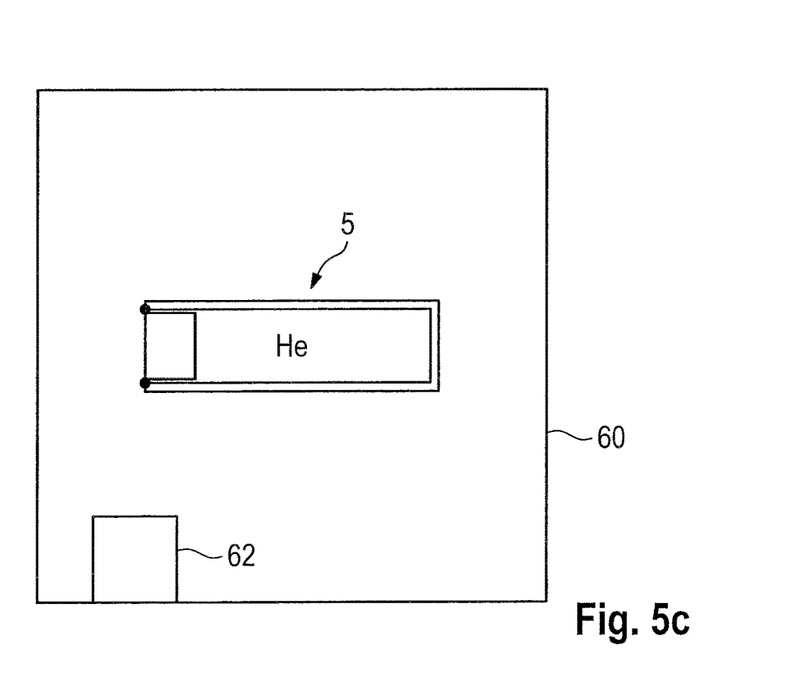
FIG. 5c illustrates the gas generator, the vacuum chamber and the helium sensor.

In FIG. 5*a*, the gas generator 5 is visible which is provided already with the pyrotechnic charge 30. Just before the last production step in manufacturing the gas generator 5 by which the interior of the gas generator 5 is sealed in a diffusion-tight manner relative to the environment of the gas generator 5, a test volume of helium is introduced into the interior of the gas generator 5. Subsequently, the housing of the gas generator 5 is hermetically sealed, indicated here by the welding of the igniter carrier 16 to the housing of the gas generator 5 via the weld seam 34. (see FIG. 5*b*) The igniter carrier 16 is indicated only schematically here and, when viewed per se, forms a hermetically tight unit and, thus, can especially include already the igniter 18 and especially the tamping 38 with an appropriate weld seam 40.

In a subsequent testing step, the gas generator 5 is introduced into a vacuum chamber 60 in which a helium sensor 62 senses whether helium escapes from the gas generator 5. (see FIG. 5*c*) Unless this is the case, it is safeguarded that the interior of the gas generator and consequently also the pyrotechnic charge located in the same as well as also the igniter are sealed in a diffusion-tight manner relative to the environment of the gas generator 5.

The invention claimed is:

1. A gas generator comprising:
   a housing,
   an igniter and
   a pyrotechnic charge via which gas for filling an airbag can be provided, wherein the pyrotechnic charge and any ignition mixtures for igniting the pyrotechnic charge are stored in an interior of the housing, wherein the gas generator is free from stored pressurized gas in an idle state of the gas generator, and wherein each possible diffusion path out of the interior of the housing is sealed relative to an environment of the gas generator by means of first weld seams and a radially circumferential second weld seam, wherein the housing includes a first housing part and a second housing part which are connected by one of the first weld seams, the housing including at least one discharge opening which is closed by a tamping, wherein the tamping is welded to the housing at least in an area between the at least one discharge opening and the one of the first weld seams, wherein the igniter is accommodated in an igniter carrier and a second tamping in the form of a cap is welded to the igniter carrier by the radially circumferential second weld seam so as to hermetically seal the housing against the igniter.

2. The gas generator according to claim 1, wherein the housing of the gas generator is hermetically closed by being formed exclusively from components of metal welded to one another.

3. The gas generator according to claim 2, wherein the igniter is fastened outside the hermetically closed housing.

4. The gas generator according to claim 1 wherein the first housing part comprises a tube and the igniter is mounted on the igniter carrier, the igniter carrier being welded to the tube in a front-side opening of the tube.

5. The gas generator according to claim 4, wherein the second housing part comprises a bottom plate, the bottom plate being welded to the tube.

6. The gas generator according to claim 5, wherein the at least one discharge opening is provided in the bottom plate of the housing.

7. The gas generator according to claim 5, wherein the bottom plate separates a combustion chamber of the gas generator from a filter chamber, and wherein the tamping is welded to the bottom plate on a combustion chamber side or on a filter chamber side.

8. The gas generator according to claim 4 wherein the at least one discharge opening is provided in a wall of the tube, and wherein the tamping is welded to the wall of the tube and closes the at least one discharge opening.

9. The gas generator according to claim 1, wherein the tamping is welded to the housing annularly around the at least one discharge opening.

10. A method for leak testing a pyrotechnic gas generator according to claim 9, wherein, before the gas generator is welded against diffusion, a test amount of helium is introduced into the housing and, in a subsequent leak testing step, a measurement is carried out to determine whether helium escapes from the housing.

11. The gas generator according to claim 1 wherein the first housing part comprises an upper shell and the second housing part comprises a lower shell.

12. The gas generator according to claim 11, wherein the at least one discharge opening is provided in the upper shell of the housing.

13. The gas generator according to claim 11, wherein the igniter carrier is welded to the lower shell of the housing.

14. A gas generator comprising:
a housing,
an igniter and
a pyrotechnic charge via which gas for filling an airbag can be provided, wherein the pyrotechnic charge and any ignition mixtures for igniting the pyrotechnic charge are stored in an interior of the housing, wherein the gas generator is free from stored pressurized gas in an idle state of the gas generator, and wherein each possible diffusion path out of the interior of the housing is sealed relative to an environment of the gas generator by means of a first weld seam, a second weld seam, a third weld seam, and a radially circumferential fourth weld seam, wherein the housing comprises a lower shell and an upper shell which are radially circumferentially connected to each other by the second weld seam, wherein the igniter is mounted in an igniter carrier and the igniter carrier is received in an opening within the lower shell and is fastened there therein by means of the third weld seam, wherein the housing includes at least one discharge opening which is closed by a tamping, wherein the tamping is welded to the housing at least in an area between the discharge opening and the second weld seam by the first weld seam, wherein the igniter is accommodated in the igniter carrier and a second tamping in the form of a cap is welded to the igniter carrier by the radially circumferential fourth weld seam so as to hermetically seal the housing against the igniter.

15. The gas generator according to claim 14 wherein the internal volume of the housing contains a test amount of helium.

16. The gas generator according to claim 14, wherein the tamping is fastened on the upper shell of the housing substantially in parallel to the second weld seam.

17. A method for manufacturing a housing assembly of a pyrotechnic gas generator comprising the steps of:
a) providing a lower shell and an upper shell having at least one discharge opening for an outer housing of the gas generator, and providing a first tamping;
b) welding the first tamping to an inner face of the upper shell in such a way that the tamping closes the at least one discharge opening;
c) welding the upper shell to the lower shell by a radially circumferential weld seam;
d) providing an igniter carrier, positioning the igniter carrier in an opening in the lower shell, and welding the igniter carrier to the lower shell, the igniter carrier comprising a central opening for receiving an igniter;
e) providing a second tamping, positioning the second tamping over the central opening of the igniter carrier, and welding the second tamping to the igniter carrier;
wherein the upper shell, lower shell, igniter carrier, first tamping and second tamping define an interior of the housing, and wherein the welding of the upper shell to the lower shell, the welding of the first tamping to the upper shell, the welding of the igniter carrier to the lower shell, and the welding of the second tamping to the igniter carrier seal each possible diffusion path out of the interior of the housing to an environment of the gas generator.

18. A gas generator comprising:
a housing comprising an upper shell positioned on a lower shell, the upper shell having at least one discharge opening;
a circumferential weld connecting the upper shell to the lower shell;
a first tamping;
a weld connecting the first tamping to an inner face of the upper shell and covering the at least one discharge opening;
an igniter carrier positioned in an opening in the lower shell, the igniter carrier comprising a central opening for receiving an igniter;
a weld connecting the igniter carrier to the lower shell;
a second tamping, positioned over the central opening of the igniter carrier;

a weld connecting the second tamping to the igniter carrier;

wherein the upper shell, lower shell, igniter carrier, first tamping and second tamping define an interior of the housing, and wherein the circumferential weld connecting the upper shell to the lower shell, the weld connecting the first tamping to the inner face of the upper shell, the weld connecting the igniter carrier to the lower shell, and the weld connecting the second tamping to the igniter carrier seal each possible diffusion path out of the interior of the housing to an environment of the gas generator.

\* \* \* \* \*